Nov. 14, 1933.  I. MACDONALD  1,934,937
COLLAPSIBLE KNOCKDOWN TABLE AND SEAT UNIT
Filed July 25, 1932  2 Sheets-Sheet 1

INVENTOR
Ian Macdonald
BY
ATTORNEY

Nov. 14, 1933.  I. MACDONALD  1,934,937
COLLAPSIBLE KNOCKDOWN TABLE AND SEAT UNIT
Filed July 25, 1932   2 Sheets-Sheet 2
*Fig.3*  *Fig.4*  *Fig.5*
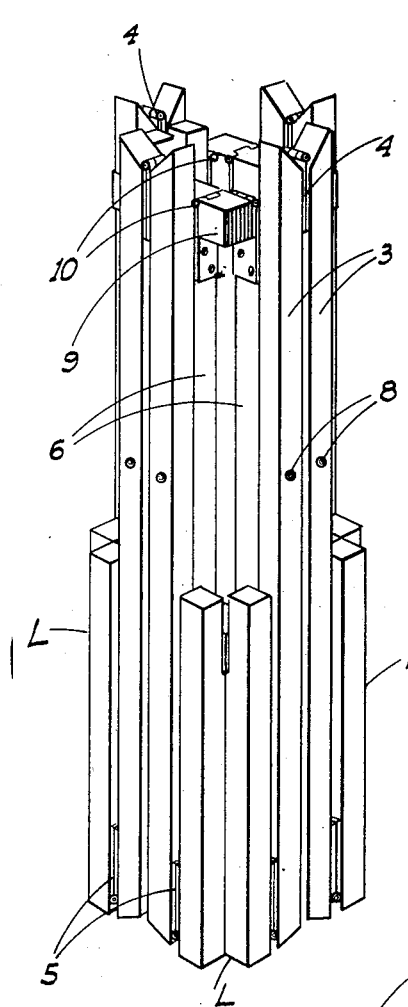
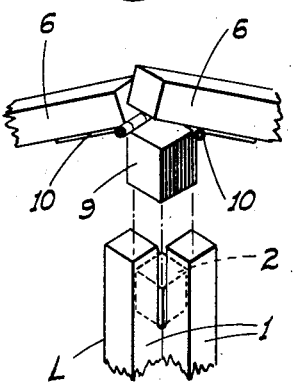
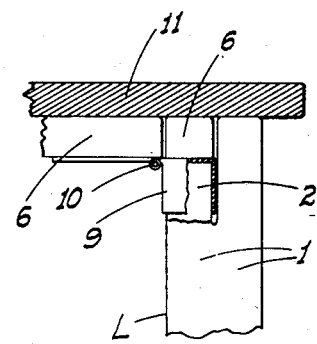
*Fig.6*
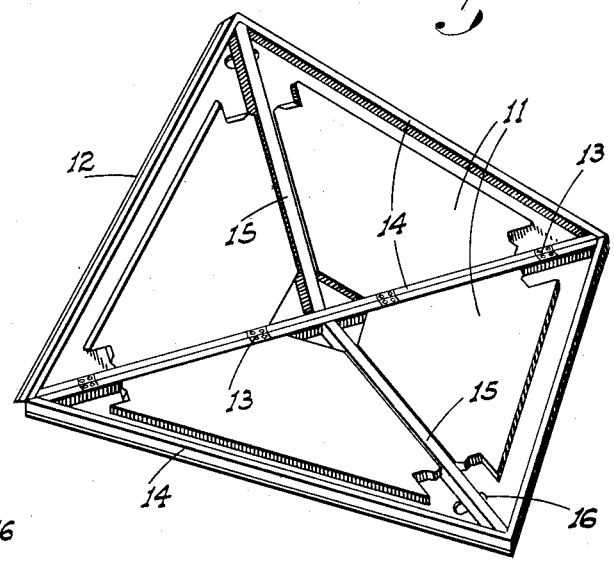
*Fig.7*  *Fig.8*
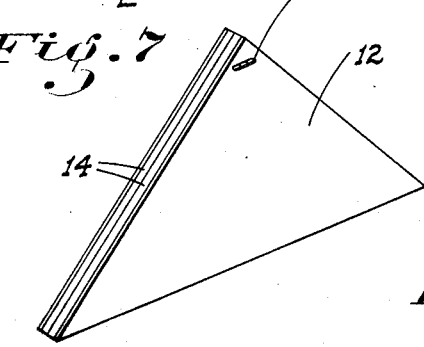
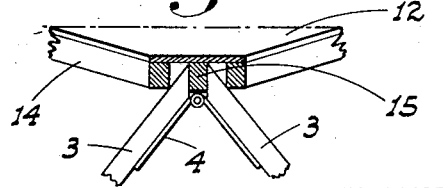
INVENTOR
Ian Macdonald
BY
ATTORNEY Patented Nov. 14, 1933

1,934,937

UNITED STATES PATENT OFFICE 1,934,937

COLLAPSIBLE KNOCKDOWN TABLE AND SEAT UNIT

Ian Macdonald, Modesto, Calif.

Application July 25, 1932. Serial No. 624,388

6 Claims. (Cl. 155—124)

This invention relates to knockdown table and seat units particularly intended for outdoor use, and especially represents modifications of the structure shown in my co-pending application for patent, Serial No. 612,775, filed May 21, 1932.

In the previous device the table was a rigid member and the supporting frames while detachable from each other could not be folded or collapsed in themselves. The structure was not therefore suitable for the use of automobile campers or the like whose equipment must be capable of being folded as to occupy a relatively small and compact space.

The principal object of the present invention therefore is to provide a structure of the above character which, while retaining all the advantages of the previous device, is arranged so that it is capable of being collapsed or folded into a sufficiently compact space as to render it suitable for use as camping equipment.

A further object is to arrange the collapsible parts so that there are no parts which require hooking, bolting or otherwise mechanically fastening together, or the reverse, when assembling or dismounting the parts. At the same time the desired rigidity necessary for serviceable use is retained.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 3 is a perspective view of the frame structure fully collapsed.

Figs. 4 and 5 are fragmentary views showing the detachable connection means between the horizontal frame bars and the corner legs.

Fig. 6 is a perspective view of the table partly folded showing the seats therein.

Fig. 7 is a similar view of the table fully folded.

Fig. 8 is a fragmentary view showing the supporting engagement of the table with the adjacent ends of a pair of frame diagonals.

Figure 1:
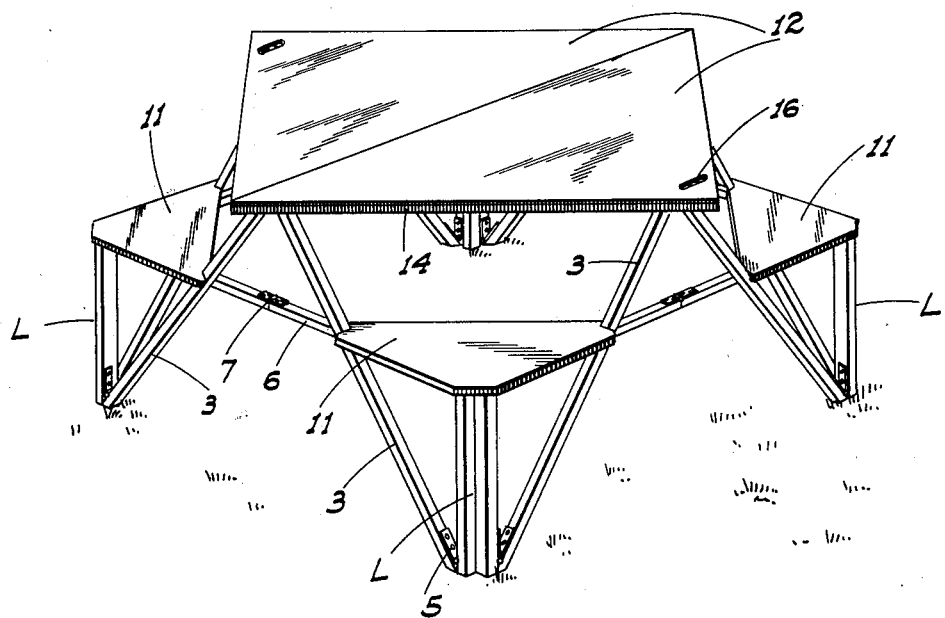
Fig. 1 is a perspective view of the assembled structure.
Figure 2:
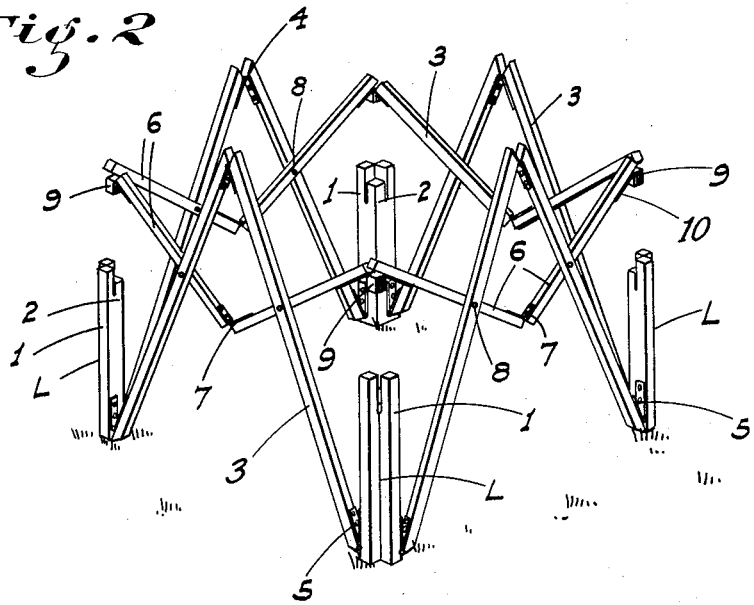
Fig. 2 is a similar view of the supporting framework alone shown as partly collapsed or folded.

Referring now more particularly to the characters of reference on the drawings, the frame structure defines a square area and is of the same general shape as in said above mentioned copending application. It comprises four corner legs L, each consisting of a pair of outer members 1 of a convenient seat height and set corner to corner; and a member 2 somewhat shorter and disposed between the members 1 at the back. These three members together form a unit and can be either made of three separate pieces or as one piece, as may be found most convenient.

Extending upwardly and toward each other from the bottom of adjacent legs on their adjacent sides are diagonal bars 3. The adjacent upper ends of these diagonals are connected together by a downwardly folding hinge 4, while the lower ends are connected to the legs at the bottom by upwardly folding hinges 5. Extending between the different pairs of adjacent legs back of the diagonals and on the same level when outstretched as the top of the leg members 1 are bar units each comprising a pair of bars 6 of the same length. These are connected at their adjacent ends by an upwardly folding hinge 7 and are pivoted to the diagonals at their points of crossing by rivets or bolts 8.

Rigid caps 9 to fit over the top of the leg members 2 are disposed at and just below the corners of adjacent bar units, being connected thereto by downwardly folding hinges 10. By means of the above arrangement of parts it will be seen that the horizontal bar units limit the divergence and consequently the lowering of the diagonals without interfering with the upward folding movement of the same. The end caps on the bar units engaging the legs when said units are fully outstretched or horizontal, hold the legs rigid against possible lateral deflection.

In addition the bars serve to support the triangular seat boards 11 which are located against horizontal shifting by reason of their notched engagement with the adjacent portions of the diagonals, to which said boards extend. Since the weight on the seats presses down on the adjacent portions of the bar units it is obviously impossible for the latter to then fold upwardly and cause a collapse of the framework, as long as any one seat is occupied.

The table is formed of two diagonally separated sections 12 connected together by downwardly folding hinges 13 so that the table when folded is of triangular form, as shown in Fig. 7. Edgings 14 of a slightly greater depth than the thickness of the seat boards depend from the table sections all around their peripheries. Brace bars or rails 15 are disposed under the table top and extend from the diagonal edgings centrally of their ends to the opposite corners, thus dividing each table section into two triangular compartments of equal size. The size of the table relative to that of the seats is such that said compartments are of a size sufficient to freely receive the different seats, as shown in Fig. 6. Then when the table is folded, as shown in Fig. 7, the seats are completely enclosed. The folded table is light enough to be readily carried by anyone, and to facilitate such carrying the table top sections adjacent their corners opposite to the diagonal line of operation, are slotted as at 16 to provide finger holds.

The rails 15 and the diagonal edgings at the corners engage the crotches formed between the upper ends of the frame diagonals when the latter are fully unfolded in supporting relation in the same manner as in the previous structure and as shown in Fig. 8. By reason of the particular arrangement and form of the different elements of the frame structure, all said elements when the structure is completely folded or collapsed, lie in parallel and adjacent relation to each other, as shown in Fig. 3, so that the folded structure then occupies a minimum of space.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a collapsible knockdown table and seat unit, a table and seat supporting frame unit comprising a plurality of corner legs, diagonals extending toward each other from the lower ends of adjacent legs to a point above the same to support a table, hinge connections between the lower ends of the diagonals and the legs, seat supports each comprising a pair of horizontal bars extending in angular relation to each other from on top of a leg to the adjacent diagonals, pivot connections between the bars and diagonals, hinge connections between the adjacent ends of the bars the inner connections being arranged for downward folding movement, and a cap depending from and incorporated in part with the outer of said last named hinge connections for engagement with means on the top of the leg; said relative position of parts of the frame unit obtaining when said unit is unfolded.

2. In a collapsible knockdown table and seat structure, a table and seat supporting frame unit including at least three table supporting units each comprising a pair of diagonals converging to their upper ends, and foldably connected together at such ends, a table supported at its corners by said units, seat supporting elements comprising horizontal bars pivoted on the diagonals intermediate their ends and projecting toward each other from adjacent diagonals of adjacent units, upstanding corner legs disposed between said adjacent diagonals and supporting the ends of the seat supporting bars, foldable hinge connections between the lower ends of the legs and the adjacent diagonals, and releasably engaging means between the outer adjacent ends of the bars and the upper ends of the corresponding legs.

3. In a collapsible knockdown table and seat unit, a supporting frame structure comprising at least three corner legs, diagonals converging upwardly toward each other from the lower ends of adjacent legs to a point above the same, a table supported at its corners by the upper ends of pairs of diagonals, hinge connections between the adjacent upper ends of pairs of diagonals, hinge connections between the lower ends of the diagonals and the legs disposed at right angles to each other, horizontal bar units extending between and releasably engaging the tops of adjacent legs in supporting relation, each unit comprising a pair of alined bars of equal length pivoted intermediate their ends on the diagonals, hinge connections between the bars of each unit, hinge connections between the bars of adjacent units, and seats in the corners between the bar units and resting on the bars, the inner corners of the seats being notched to fit the diagonals to hold the seats against horizontal displacement.

4. In a collapsible knockdown table and seat unit, a supporting frame structure comprising at least three corner legs, diagonals converging upwardly toward each other from the lower ends of adjacent legs to a point above the same, a table supported at its corners by the upper ends of pairs of diagonals, hinge connections between the adjacent upper ends of pairs of diagonals, hinge connections between the lower ends of the diagonals and the legs, foldable means connected to the diagonals and arranged when unfolded to prevent diverging movement of the diagonals beyond a predetermined position, said means including bars pivoted on and extending from adjacent diagonals to the legs, means releasably connecting the legs and bars against relative horizontal movement, and seats in the corners between and resting on the bars.

5. In a collapsible knockdown table and seat unit, a supporting frame structure comprising at least three corner legs, diagonals converging upwardly toward each other from the lower ends of adjacent legs to a point above the same, a table supported at its corners by the upper ends of pairs of diagonals, hinge connections between the adjacent upper ends of pairs of diagonals, hinge connections between the lower ends of the diagonals and the legs, seat supports each comprising a pair of horizontal bars extending from on top of a leg to the adjacent diagonals, pivot connections between the bars and diagonals, pivot connections between the adjacent ends of the bars arranged for upward folding movement, seats in the corners between and resting on adjacent bars, and a cap depending from and incorporated in part with said last named hinge connections and in engagement with means on the top of the leg.

6. In a collapsible knockdown table and seat unit, a supporting frame structure comprising at least three corner legs, diagonals converging upwardly toward each other from the lower ends of adjacent legs to a point above the same, a table supported at its corners by the upper ends of pairs of diagonals, hinge connections between the adjacent upper ends of pairs of diagonals, hinge connections between the lower ends of the diagonals and the legs disposed at right angles to each other, foldable means connected to the diagonals and arranged when unfolded to prevent diverging movement of the diagonals beyond a predetermined position, said means including bars pivoted on and extending from adjacent diagonals to and supported on the legs, extensions on the legs outwardly of the bars projecting upwardly alongside the outer faces of the bars, and seats in the corners between and resting on the bars.

IAN MACDONALD.